3,400,761
USE OF FLUID FLOW BARRIERS IN THE
SECONDARY RECOVERY OF OIL
James R. Latimer, Jr., and Gene W. Snell, Dallas, Tex., assignors to Hunt Oil Company, Dallas, Tex., a corporation of Delaware
Filed Dec. 27, 1965, Ser. No. 516,653
20 Claims. (Cl. 166—9)

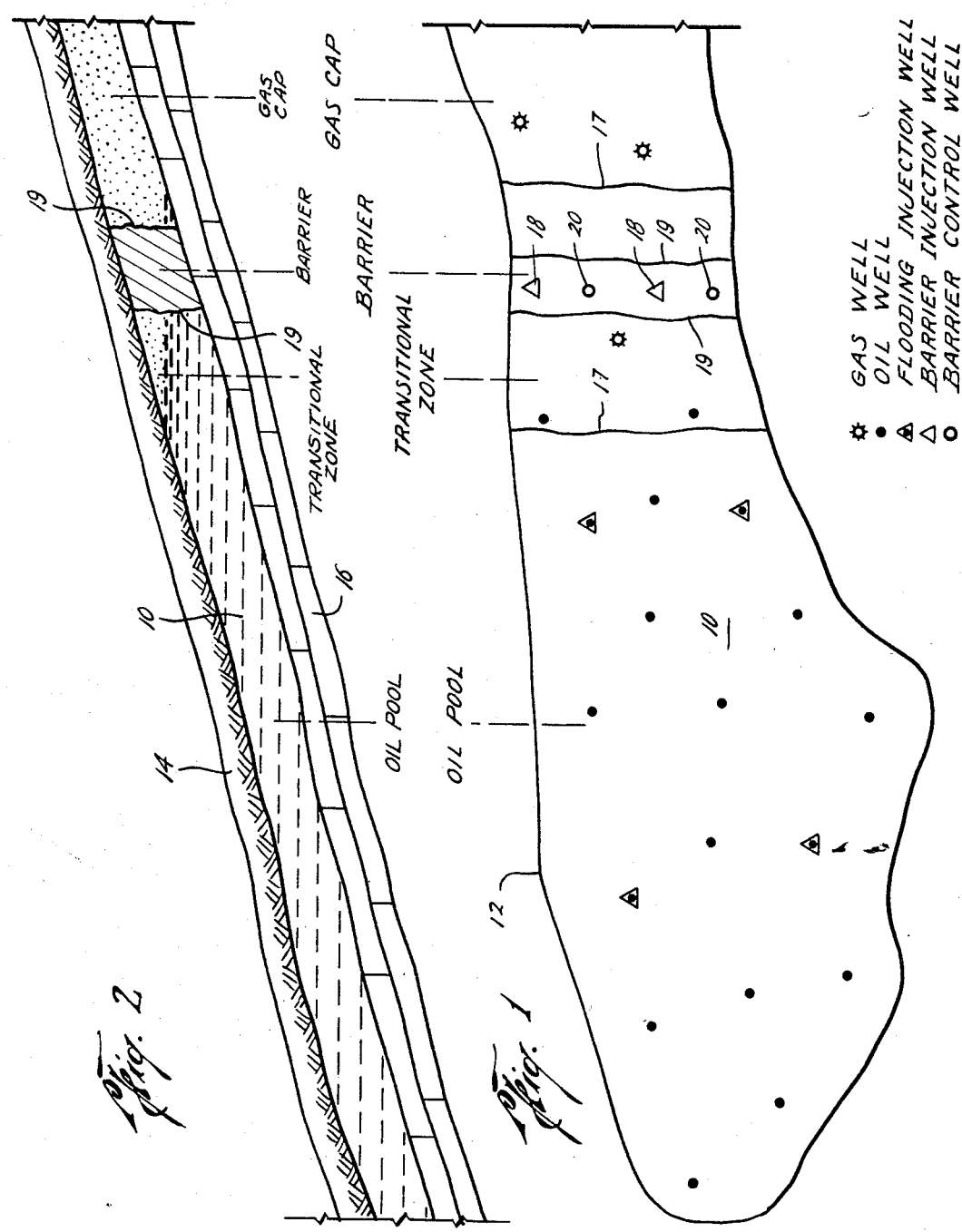

ABSTRACT OF THE DISCLOSURE

A method for working a subterranean reservoir includes effectively blocking fluid flow between the reservoir and a second reservoir by the injection between the reservoirs of a fluid blocking material having a viscosity and stability sufficient under reservoir conditions to permit maintenance of an effective fluid block; such as an aqueous solution of water-soluble, hydrolyzed polyacrylamids.

---

The invention concerns a method suitable for the secondary recovery of oil, as well as for working other geological formations.

In the secondary recovery of oil and/or hydrocarbons, a flooding medium, such as water, natural gas, inert gas, or an aqueous solution containing various additives, is usually injected into the oil formation to force the oil therein into producing wells surrounding the injection well.

One disadvantage in secondary recovery is that the injected medium can oftentimes force the oil as well as itself into undesirable locations. For example, in a reservoir containing an oil pool and a gas cap, injection of a flooding medium into the oil pool for secondary recovery can force the oil into the gas cap where recovery of the oil may be even more difficult. In addition, if gas wells are located in the gas cap, these wells may be affected deleteriously if the flooding medium is forced into their producing zone.

The invention provides a method suitable for recovering oil from a subterranean reservoir having an oil pool and a gas cap, without materially harmful effects to either the gas cap or the oil pool. More generally, methods in accordance with the invention permit working a subterranean formation without materially affecting adjacent formations having fluid communications therewith.

In the drawing:

FIG. 1 is a schematic representation in plain view of a subterranean reservior having an oil pool and a gas cap meeting in a transitional zone along a nonhorizontal slope.

FIG. 2 is a schematic representation of a vertical section through the reservoir shown in FIG. 1, all wells into the reservoir being omitted.

As shown in the drawing, the subterranean oil reservoir 10 having one or more fluids separated or combined in one or more fluid permeable strata, such as sandstone or limestone, has in a generally horizontal direction a porosity boundary 12. Above the reservoir 10 lies an impermeable layer 14, such as shale, with a second impermeable layer 16 lying below the reservoir 10. Within the reservoir 10 is an oil pool and a gas cap meeting in a transitional zone along a nonhorizontal slope, the general boundary of this zone being indicated in FIG 1 by the lines 17.

As used herein the term transitional zone refers to a geological formation, ordinarily a natural formation, having sufficient permeability and porosity for fluid flow therethrough, and lying between permeable strata which may contain one or more fluids, or between two sections of one or more permeable strata which sections may have different fluids or fluid characteristics therein.

In accordance with the invention, the recovery of oil from the subterranean reservoir 10 includes the step of effective blocking fluid flow between the oil pool and the gas cap by injecting into the reservoir at least near the transitional zone a fluid blocking material in an amount sufficient to block effectively fluid flow between the oil pool and the gas cap, thereby forming a barrier indicated by the lines 19. The blocking material may be injected into the transitional zone through barrier injection wells 18 located to communicate with the transitional zone and place the blocking material in the chosen position. Placement of the blocking material in the reservoir 10 is preferably controlled by producing barrier control wells 20 while injecting the blocking material into the barrier injection wells 18, thereby to induce the blocking material into blocking position across the reservoir 10. Barrier control wells 20 may be located in a position where they are able to define and control the movement and shape of the viscous barrier.

When the barrier material is in place and effectively blocking fluid flow between the oil pool and the gas cap, injection of a flooding medium into the oil pool through the flooding injection wells illustrated in the drawing while producing through oil wells will not materially affect the gas cap. Consequently, at the same time the oil is being recovered pursuant to a flooding program, gas may be recovered from the gas cap without damage from the flooding medium.

The blocking material employed must have a viscosity and stability sufficient under reservoir conditions to maintain an effective fluid block, or at least to permit maintenance of an effective fluid block. To permit working the reservoir on either side of the barrier, the blocking material should have a viscosity and stability under reservoir conditions sufficient to maintain an effective fluid block without need for artificial pressurization on one or more sides of the block to hold it effectively in place. Preferred practice in accordance with the invention is to maintain the fluid block, if necesary, by controlled injections of blocking material into the blocked zone in amounts sufficient to maintain the fluid block, ordinarily at rates much lower than those first used to establish the block.

The preferred blocking material is an aqueous solution comprising at least one of the water-soluble hydrolyzed polyacrylamides or the water-soluble salts thereof in an amount sufficient to form a suitable blocking material under reservoir conditions. Water-soluble hydrolyzed polyacrylamides having between about 0.8 and about 67 percent of the original carboxamide groups converted to carboxyl groups, including water-soluble salts thereof, may be chosen as suitable materials in view of particular reservoir conditions.

Water-soluble partially hydrolyzed polyacrylamides are particularly well adapted for use as viscosity increasing additives in the method of the invention. Such polymers are exceptionally stable with respect to precipitation from aqueous solutions by heat and/or mineral anions and cations, and relatively small amounts are effective in achieving the desired increase in viscosity.

Partially hydrolyzed acrylamide polymers which may be employed in accordance with the invention are water-soluble acrylamide polymers which have been hydrolyzed to such an extent that between about 0.8 and about 10 percent of the amide groups have been converted to carboxyl groups. As herein employed, the term "acrylamide polymer" is inclusive of the homopolymers of acrylamide, i.e., polyacrylamide, and water-soluble copolymers of acrylamide with up to about 15 percent by weight of other polymerizable vinyl compounds such as the alkyl esters of acrylic and methacrylic acids, methacrylamide, styrene, vinyl acetate, acrylonitrile, methacrylonitrile, vinyl alkyl ethers, vinyl chloride, vinylidene chloride, etc. Such copolymers are conventionally obtained by subjecting a suitable mixture of the monomers to polymerizing conditions, usually under the influence of a polymerization catalyst such as benzoyl peroxide. In addition, the acrylamide polymers suitable for use in accordance with the invention are of sufficiently high molecular weight that a 0.5 percent by weight aqueous solution thereof has a viscosity of at least about 4, preferably at least about 10, centipoises (Ostwald) at 21.5° C. In order to facilitate ready solution of the polymer in the aqueous barrier medium it is preferable that it be employed in finely-divided form. The general manner in which acrylamide is polymerized or copolymerized and thereafter partially hydrolyzed to form the present viscosity-increasing additives is well known in the polymer art. Preferably the polymerization or copolymerization is controlled through the use of specific polymerization catalysts and/or specific conditions of temperature and pressure to form long chain polymeric molecules which are characterized by a minimum of cross-linkages. The molecular weight is likewise controlled by varying the polymerization conditions and/or the cataylst employed. Hydrolysis of the polymers is accomplished by reacting the polymer with sufficient of a base, e.g., sodium hydroxide, to hydrolyze between about 0.8 and about 10 percent, for example, of the amide groups present in the polymer molecule. The resulting product consists of a long hydrocarbon chain the alternate carbon atoms of which bear either amide or carboxylic groups, with the ratio of amide to carboxylic groups being between about 9/1 and about 124/1, for example. A number of partially hydrolyzed acrylamide polymers suitable for use in practice of the invention are commercially available.

It has been discovered that water-soluble, high molecular weight, hydrolyzed polyacrylamides, having from 12 to about 67 percent of the original carboxamide groups hydrolyzed to carboxyl groups, have particular advantageous properties for preparing viscous aqueous compositions for use in accordance with the invention. Thus, the present invention embodies a method employing as a blocking material one or more aqueous compositions rendered more viscous by the incorporation therein of hydrolyzed polyacrylamides containing from 12 to about 67, and preferably from 12 to about 45, mole percent of acrylic acid moieties in combined form in the molecules. An advantage of these materials is that they are not rendered insoluble by the presence in the solution of concentrations of calcium ions and sodium ions such as are commonly encountered in oil field brines. Yet another advantage resides in the fact that only very small amounts of the high molecular weight, hydrolyzed polyacrylamides are required to achieve high viscosities in the blocking material.

The hydrolyzed polyacrylamides employed in the present invention are preferably water-soluble, substantially free of cross-linking between polymer chains, and have from 12 percent to about 67 percent, and preferably from 12 to about 45 percent, of the carboxamide groups originally present in the polyacrylamide hydrolyzed to carboxyl groups. The term "hydrolyzed polyacrylamide," as employed herein, is inclusive of the modified polymers wherein the carboxyl groups are in the acid form and also of such polymers wherein the carboxyl groups are in the salt form, provided that the salts are water-soluble. Thus, for example, the hydrolyzed polyacrylamides may be employed in the form of sodium, potassium or other alkali metal salt, the ammonium salt or mixed salts of sodium, potassium, magnesium, calcium, and the like. Salts of polyvalent ions, such as iron and aluminum, are to be avoided for reasons of insolubility. The polyacrylamides, from which the hydrolyzed polyacrylamides of the invention are derived, may be homopolymers of acrylamide or copolymers thereof with up to about 10 to 15 percent by weight of other suitable polymerizable vinyl compounds such as vinyl acetate, acrylonitrile, methacrylonitrile, vinyl alkyl ethers, vinyl chloride, and the like, provided that the copolymers so employed are characterized by water-solubility and freedom from cross-linking as set forth above. Thus, the hydrolyzed polyacrylamides, as preferably employed in the present invention, may be represented graphically by the following general composition:

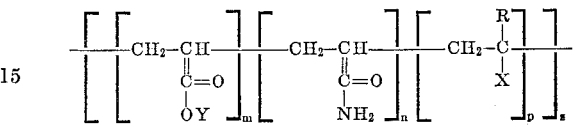

wherein Y represents hydrogen, ammonium, an alkali metal or an alkaline earth metal, R represents hydrogen or a methyl radical, X represents chlorine, a lower alkoxy or acyloxy group or a cyanide radical, $m$ ranges from 12 to 67, $n$ ranges from 33 to 88, $p$ ranges from 0 to 10 and the sum of $m$, $n$ and $p$ equals 100, and $z$ is at least about 60.

Further, the hydrolyzed polyacrylamides preferably employed in accordance with the present invention are characterized by high molecular weight. As a result it is possible to obtain aqueous solutions having a desirably increased viscosity with the use of a minimum amount of the polymeric ingredient. The hydrolyzed polyacrylamides preferably employed are characterized by a molecular weight of at least 500,000 and molecular weights of 1,000,000 or more are preferred. The viscosity of a standard solution of polymer under controlled conditions is correlated with the molecular weight of the polymer. Accordingly it has been found that the preferred hydrolyzed polyacrylamides suitable for use in the invention are those characterized by a viscosity of at least 6 centipoises for a 0.5 percent by weight solution thereof in aqueous 4 percent by weight sodium chloride solution at a temperature of 25° C. as determined with an Ostwald viscosimeter.

Acrylamide polymers may be prepared in known manner, as, for example, by heating acrylamide in aqueous solution with a peroxide catalyst such as an alkali metal persulfate or an organic hydroperoxide or by photopolymerizing acrylamide in aqueous solution with an activator such as riboflavin. The resulting polyacrylamide may be hydrolyzed in any suitable fashion, as, for example, by heating an aqueous solution of polyacrylamide with the appropriate amount of sodium hydroxide or other alkali metal hydroxide to produce the desired hydrolyzed polyacrylamide. The latter may be employed in the invention directly as produced in aqueous solution. Alternatively the hydrolyzed polyacrylamide may be dried and flaked or powdered as on a drum drier or the desired product may be precipitated from solution by addition of a water-miscible organic solvent such as methanol, ethanol or acetone.

In carrying out the invention, the hydrolyzed polyacrylamide is dissolved in water in accordance with any suitable method to provide a solution having the desired viscosity. For example, the hydrolyzed polyacrylamide may be dissolved in brine, or an aqueous solution of said polymer may be diluted with brine to form a solution having ionic constituents similar or identical to those in the connate water in the field wherein the blocking material is to be employed. In one method of operation, the viscous blocking solution may be prepared with oil field brine obtained from the producing strata or from strata adjacent to the producing strata whereby undesired changes in the strata may be minimized.

In such operations, the concentration of the hydrolyzed polyacrylamide in the water or brine employed to produce the blocking material may be adjusted to produce the desired viscosity of said material. In general, with the high molecular weight hydrolyzed polyacrylamides preferably employed, that is, with polymers having a molecular weight of at least 500,000, it is desirable to employ from about 0.01 to 0.5 percent by weight or more hydrolyzed polyacrylamide in the blocking material. Between about 0.01 and about 1.5 percent by weight may be mentioned as a general range. In practice the blocking material may have a viscosity of from slightly over that of pure water (1.0 centipoise at 20° C.) to about 1000 centipoises and preferably from about 1.1 to about 100 centipoises. The exact viscosity to be employed for maximum efficiency will vary depending upon such factors as the porosity and permeability of the formation, the viscosity of the native fluids in the formation and the particular type of strata involved.

In the final preparation of the blocking material for injection into the strata, it is generally desirable that the blocking material be free of undissolved solids which may filter out and plug the face of the formation, thus preventing further injection. Conventional filtration operations using a filter-aid such as diatomaceous earth will usually suffice to remove undissolved solids. Similarly, it is desirable to avoid constituents in the blocking material which may react with the strata or the connate water therein, as for example, by the precipitation of inorganic salts in the pores of the formation, thereby causing problems in the placement of the blocking material. It is sometimes desirable to incorporate a sequestering agent such as citric acid or sodium ethylenediamine tetraacetate in the blocking material. Other conventional additaments such as antimicrobial agents to prevent the growth of micro-organisms in the blocking material may also be incorporated. It may be desirable to adjust the pH of the blocking material to approximately the pH of the native fluids in the formation and in any case the blocking material should be maintained at a pH of from about 5 to 9 in order to avoid possibly undesirable changes in the composition of the hydrolyzed polyacrylamide.

In any particular instance, the minimal concentration of hydrolyzed polyacrylamide required to provide effective blocking of a formation may be ascertained by laboratory tests on core samples obtained from the field in which the placement of a viscous aqueous barrier is contemplated. In general, it is desirable that such tests be run on several core samples to guard against variations normally encountered in such samples.

The method of the invention has been proved by the following experiment:

An aqueous solution of by weight 0.025 percent partially hydrolyzed polyacrylamide was injected over an extended period into the Crane zone (oolitic limestone) of the Pettit formation. The reservoir, which was similar in shape to the one disclosed in the drawing, contained an oil pool with a gas cap in communication through a common porous and permeable strata having initial bottom hole pressure at about 1300 p.s.i.g. and bottom hole temperature at about 230° F. The polyacrylamide, which was selected after tests on core samples, was hydrolyzed polyacrylamide having approximately 24 percent of the original carboxamide groups hydrolyzed to carboxyl groups and characterized by viscosity between 40 and 50 centipoises for a 0.5 percent by weight solution thereof in an aqueous 4 percent by weight sodium chloride solution at a temperature of 25° C. as determined with an Ostwald viscosimeter.

The blocking material was injected through two injection wells spaced in the transitional zone between the oil pool and the gas cap and located along a line approximately perpendicular to the direction of slope in the reservoir. Two wells approximately along the same line, and spaced as shown in the drawing, were produced during injection to induce rapid placement of the blocking material in its chosen place across the oil reservoir.

At the same time the viscous aqueous barrier was being placed to restrict fluid flow through the reservoir, the oil pool was being water flooded. Because of the distances between the water flood injection wells and the barrier, the flood water did not materially affect the gas cap area prior to establishment of the barrier. Wells in the gas cap were also produced.

After about 1.1 million barrels of blocking material were injected experimentally, production from wells on both sides of the block has established that the block is effective. Gas production on the oil side decreased to virtually nothing, and gas production from wells on the gas side showed a marked decrease in the oil content with no increase in water content.

The reservoir has since been produced continuously, and the block has remained effective. Injection of the blocking material into the formation has continued at a decreased rate to ensure maintenance of an effective block.

The methods disclosed herein may also be employed to work geological formations other than oil reservoirs. For example, flow from a salt water reservoir into a fresh water reservoir may be effectively blocked in accordance with the principles disclosed herein to permit withdrawal of fresh water without contamination from the salt water. Similarly, if a fluid is to be injected into a formation, such as in the storage of propane, butane, natural gas, and the like, or in the avoidance of ground settling, the methods disclosed herein may be advantageously employed to keep the injected material from moving to an undesirable location. Or a section of a formation may be blocked to permit working on one side of the block without material effects to or from the formation on the other side of the block.

Depending on the reservoir conditions, such as temperature, pressure, chemical nature, porosity, and the like, viscosity-increasing additives other than hydrolyzed polyacrylamides may be employed in accordance with the invention, although the hydrolyzed polyacrylamides are definitely preferred. Orangic materials such as fatty-acid soaps, alginates, sucrose, glycerine, carboxymethyl-cellulose, and water-soluble polymers such as polyvinyl alcohol, polyacrylic acid and its salts, and the like may be mentioned as materials from which a suitable viscosity-increasing additive to water may be selected for a particular application. In this regard, reaction of the blocking agent with chemicals in the reservoir may be tolerated in many instances as long as the reaction does not inhibit unduly injection of the blocking material before the block can be established and effectively maintained. In addition, a material which sets or hardens after injection may be employed if the material is capable of establishing and maintaining the block before hardening. Such a material, however, must be selected carefully to ensure that it does not set around the barrier injection well before a block is established, thereby preventing maintenance of a block at least from that particular injection well.

What is claimed is:

1. A method for recovering oil from a subterranean reservoir having an oil pool and a gas cap meeting in a transitional zone along a nonhorizontal slope, which method comprises effectively blocking fluid flow between said oil pool and said gas cap by injecting into said reservoir at least near said transitional zone a fluid blocking material in an amount sufficient to block effectively fluid flow therebetween, said blocking material having a viscosity and stability sufficient under reservoir conditions at least to permit maintenance of an effective fluid block; injecting a flooding medium into said oil pool without material effects to said gas cap; and recovering oil from said oil pool.

2. The method defined in claim 1 wherein said flooding medium includes water.

3. The method defined in claim 1 wherein said fluid blocking material is injected into said reservoir through at least one injection well and the position of said blocking material in said reservoir is controlled by removing fluid from at least one other well located so as to induce said blocking material to flow into blocking position.

4. The method defined in claim 1 wherein said method includes the step of recovering gas from said gas cap.

5. The method defined in claim 1 wherein said blocking material is an aqueous solution comprising an organic polymer in an amount sufficient to render said solution sufficiently viscous and stable under reservoir conditions to maintain an effective fluid block between said oil pool and said gas cap without need for artificial pressurization on each side of said block to hold it in place.

6. The method defined in claim 1 wherein said method includes the step of effectively maintaining a fluid block after establishment thereof by injecting said blocking material into said fluid block, at least continually, in amounts sufficient to maintain said block.

7. The method defined in claim 1 wherein said blocking material is an aqueous solution comprising at least one of the group consisting of water-soluble hydrolyzed polyacrylamides and water-soluble salts thereof.

8. The method defined in claim 1 wherein said blocking material is an aqueous solution comprising at least one polymer of the group consisting of water-soluble hydrolyzed polyacrylamides having between about 0.8 and about 67 percent of the original carboxamide groups converted to carboxyl groups, and water-soluble salts thereof.

9. The method defined in claim 1 wherein said blocking material is an aqueous solution comprising at least one polymer of the group consisting of water-soluble hydrolyzed polyacrylamides having between about 12 and about 67 percent of the original carboxamide groups hydrolyzed to carboxyl groups, and water-soluble salts thereof; said polymer being characterized by a viscosity of at least 6 centipoises for a 0.5 percent by weight solution thereof in aqueous 4 percent by weight sodium chloride solution at a temperature of 25° C. as determined with an Ostwald viscosimeter.

10. The method defined in claim 1 wherein said blocking agent is an aqueous solution comprising at least one polymer of the group consisting of water-soluble hydrolyzed polyacrylamides having about 24 percent of the original carboxamide groups hydrolyzed to carboxyl groups, and water-soluble salts thereof; said polymer being characterized by viscosity of between about 40 and about 50 centipoises for a 0.5 percent by weight solution thereof in an aqueous 4 percent by weight sodium chloride solution at a temperature of 25° C. as determined with an Ostwald viscosimeter.

11. A method for working at least one of a first subterranean reservoir and a second subterranean reservoir having therebetween a geological transitional zone subject to fluid flow therethrough, which method comprises effectively blocking fluid flow between said first reservoir and said second reservoir by injecting between said first reservoir and said second reservoir at least near said transitional zone a fluid blocking material in an amount sufficient to block effectively fluid flow through said transitional zone, said blocking material having a viscosity and stability sufficient under reservoir conditions at least to permit maintenance of an effective fluid block without producing said blocking material; said blocking material remaining fluid under reservoir conditions; and working at least one of said first reservoir and said second reservoir without material effects to or from the other reservoir.

12. The method defined in claim 11 wherein said working includes the injection of water to pressurize the worked reservoir.

13. The method defined in claim 11 wherein both of said first reservoir and said second reservoir contain water.

14. The method defined in claim 11 wherein said blocking material is injected between said first and second reservoirs through at least one injection well and the position of said blocking material therebetween is controlled by removing fluid from at least one other well located so as to induce said blocking material to flow into blocking position.

15. The method defined in claim 11 wherein said method includes the step of effectively maintaining a fluid block after establishment thereof by injecting said blocking material into said fluid block, at least continually, in amounts sufficient to maintain said block.

16. The method defined in claim 11 wherein said blocking material is an aqueous solution comprising an organic polymer in an amount sufficient to render said solution sufficiently viscous and stable under reservoir conditions to maintain an effective fluid block between said first reservoir and said second reservoir without need for artificial pressurization on each side of said block to hold it in place.

17. The method defined in claim 11 wherein said blocking material is an aqueous solution comprising at least one of the group consisting of water-soluble hydrolyzed polyacrylamides and water-soluble salts thereof.

18. The method defined in claim 11 wherein said blocking material is an aqueous solution comprising at least one polymer of the group consisting of water-soluble hydrolyzed polyacrylamides having between about 0.8 and about 67 percent of the original carboxamide groups converted to carboxyl groups, and water-soluble salts thereof.

19. The method defined in claim 11 wherein said blocking material is an aqueous solution comprising at least one polymer of the group consisting of water-soluble hydrolyzed polyacrylamides having between about 12 and about 67 percent of the original carboxamide groups hydrolyzed to carboxyl groups, and water-soluble salts thereof; said polymer being characterized by a viscosity of at least 6 centipoises for a 0.5 percent by weight solution thereof in aqueous 4 percent by weight sodium chloride solution at a temperature of 25° C. as determined with an Ostwald viscosimeter.

20. The method defined in claim 11 wherein said blocking agent is an aqueous solution comprising at least one polymer of the group consisting of water-soluble hydrolyzed polyacrylamides having about 24 percent of the original carboxamide groups hydrolyzed to carboxyl groups, and water-soluble salts thereof; said polymer being characterized by viscosity of between about 40 and about 50 centipoises for a 0.5 percent by weight solution thereof in an aqueous 4 percent by weight sodium chloride solution at a temperature of 25° C. as determined with an Ostwald viscosimeter.

References Cited

UNITED STATES PATENTS

| | | | |
|---|---|---|---|
| 2,713,906 | 7/1955 | Allen | 166—45 X |
| 3,087,543 | 4/1963 | Arendt | 166—32 X |
| 3,152,640 | 10/1964 | Marx | 166—9 |
| 3,237,690 | 3/1966 | Karp et al. | 166—33 X |
| 3,288,212 | 11/1966 | O'Brien et al. | 166—9 |
| 3,297,088 | 1/1967 | Huitt et al. | 166—33 |
| 3,318,380 | 5/1967 | Tenny | 166—33 X |

STEPHEN J. NOVOSAD, *Primary Examiner.*